United States Patent
Yue et al.

(10) Patent No.: US 12,402,065 B2
(45) Date of Patent: Aug. 26, 2025

(54) METHOD AND APPARATUS FOR RESTRICTING ACCESS OF DEVICES

(71) Applicant: Lenovo (Beijing) Ltd., Beijing (CN)

(72) Inventors: Ran Yue, Haidian District (CN); Lianhai Wu, Chaoyang (CN); Jing Han, Chaoyang District (CN); Jie Shi, Haidian District (CN); Haiming Wang, Xicheng District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 604 days.

(21) Appl. No.: 17/796,741

(22) PCT Filed: Feb. 7, 2020

(86) PCT No.: PCT/CN2020/074523
§ 371 (c)(1),
(2) Date: Aug. 1, 2022

(87) PCT Pub. No.: WO2021/155588
PCT Pub. Date: Aug. 12, 2021

(65) Prior Publication Data
US 2024/0031909 A1    Jan. 25, 2024

(51) Int. Cl.
*H04W 48/02* (2009.01)
*H04W 48/08* (2009.01)

(52) U.S. Cl.
CPC ........... *H04W 48/02* (2013.01); *H04W 48/08* (2013.01)

(58) Field of Classification Search
CPC ............................. H04W 48/02; H04W 48/08
See application file for complete search history.

(56) References Cited

U.S. PATENT DOCUMENTS

2021/0227451 A1\*   7/2021   Babaei ................. H04W 48/12

FOREIGN PATENT DOCUMENTS

| CN | 106170136 A | 11/2016 |
|----|----|----|
| WO | 2016120462 A1 | 8/2016 |
| WO | 2019092196 A1 | 5/2019 |
| WO | 2019117791 A1 | 6/2019 |
| WO | 2019193469 A1 | 10/2019 |

OTHER PUBLICATIONS

"Non-Access-Stratum (NAS) protocol for 5G System (5GS)", 3GPP TS 24.501, 3rd Generation Partnership Project, V2.0.0 [retrieved Aug. 23, 2022]. Retrieved from the internet <https://www.3gpp.org/ftp/Specs/archive/24_series/24.501/>., Jun. 2018, 347 Pages.
PCT/CN2020/074523 , "International Preliminary Report on Patentability", PCT Application No. PCT/CN2020/074523, Aug. 18, 2022, 5 pages.
PCT/CN2020/074523 , "International Search Report and Written Opinion", PCT Application No. PCT/CN2020/074523, Nov. 11, 2020, 6 pages.

\* cited by examiner

*Primary Examiner* — Curtis B Odom
(74) *Attorney, Agent, or Firm* — FIG. 1 Patents

(57) ABSTRACT

Embodiments of the present application are directed to a method and apparatus for restricting access of devices. The receiving cell access related method may include: receiving cell access related information; and information performing an access control based on the cell access related information and a device type of a user equipment (UE).

20 Claims, 3 Drawing Sheets

METHOD AND APPARATUS FOR RESTRICTING ACCESS OF DEVICES

TECHNICAL FIELD

The present application generally relates to wireless communication technology, and especially to a method and apparatus for restricting access of devices, especially the devices with reduced capabilities.

BACKGROUND

For the long term evolution (LTE) system, each user equipment (UE) has an access class. There is a total of 15 access classes defined in LTE. Access class information for a UE is stored in the universal subscriber identity module (USIM) or subscriber identity module (SIM) card. Even among those 15 categories there are ordinary and special categories defined. Ordinary categories include access classes 0-9, and special categories includes access classes 11-15. These access classes help the UE to delay or allow services such as mobile originating signaling, mobile originating data, voice service etc.

In idle mode, based on the access class a UE will be treated differently when it comes to emergency call, mobile originated (MO) signaling setup, MO data session, voice call, video call, and circuit switch (CS) fall back. Cell barring for these access classes depend on the following parameters (or referred to as access class barring parameters): barring factor, which can have a value from 0 to 0.95 in steps of 0.05, and determines if a UE needs to treat a cell as barred or not; barring time, which decides how long of a duration the cell will be treated as barred by a UE and can have a value such as 4, 8, 16, 32, 64, 128, 256 and 512 seconds; barring for special access class, which is a Boolean parameter and has a value either TRUE or FALSE, and if cell barring is applied for special access classes then barring for special access class will have a value TRUE and vice versa.

The UE with access classes 11-15 has higher priority in some applications. The UE with access classes 0-9 use the same access probability, that is, barring factor (ac-BarringFactor)+barring time (ac-BarringTime). For UE with access classes 11-15, the bitmap method is used. The access class barring parameters of the LTE system are included in system information block 2 (SIB2). When detecting that congestion occurs or needs to prohibit certain UE(s) from accessing, the network side will broadcast the access class barring parameters in SIB2. For the UE with access classes 0-9, after reading the SIB2 which carries the access class barring parameters, and before initiating a random access, the UE will generate a random number 'rand' (0≤rand<1). If 'rand'<ac-BarringFactor, the UE can initiate access; Otherwise, the UE will start a timer "Tbarring"=(0.7+ 0.6*rand)*ac-BarringTime. Within the duration of the timer running, radio resource control (RRC) layer of the UE will not initiate a random access any longer.

For the UE with access classes 11-15, when one of the corresponding bits in the barring parameters for special access class is set to 0, an access can be initiated directly; otherwise, the UE will generate a random number 'rand' (0≤rand<1), if 'rand'<ac-BarringFactor, the UE can initiate an access, otherwise it will start a timer "Tbarring"=(0.7+ 0.6*rand)*ac-BarringTime. Within the duration of the timer running, the RRC layer of the UE will not initiate a random access any longer.

In 3GPP new radio (NR) scenario, a reduced capability NR device is introduced. The reduced capability NR device may also be referred to as a NR-Light user equipment (UE) or a device with reduced capability, which may refer to a UE that can perform signal transmission within a relatively narrow bandwidth (e.g. from a few Mbps to tens of Mbps), operate with low power consumption, operate with few resources, or operate with flexible latency requirement, etc.

Currently, the NR light devices can serve in three types of application scenarios, such as acting as industrial wireless sensors, video surveillances and wearables. One objective of NR light devices, among others, is to achieve functionality that will allow devices with reduced capabilities to be explicitly identifiable to networks and network operators, and allow operators to restrict their access, if desired.

SUMMARY OF THE APPLICATION

Embodiments of the present application provide a method and apparatus for restricting access of devices.

An embodiment of the present application provides a method. The method may include: receiving cell access related information; and performing an access control based on the cell access related information and a device type of a UE.

In an embodiment of the present application, the cell access related information includes indication information which indicates devices with the device type of reduced capabilities are allowed to access a cell or barred to access the cell, and performing access control includes performing the access control based on the indication information and the device type of the UE.

In an embodiment of the present application, the method further includes identifying an access identity (AI) and an access category (AC) of the UE; and identifying the device type of the UE as reduced capabilities according to the identified AC.

In an embodiment of the present application, the cell access related information includes access control parameters, and performing the access control includes checking whether an access is barred by using the access control parameters corresponding to the identified AC of the UE.

In an embodiment of the present application, using the access control parameters corresponding to the identified AC of the UE further includes: determining an AC of a regular device corresponding to the identified AC, according to a mapping table which defines a mapping between ACs of the regular device and ACs of the UE with the device type of reduced capabilities; and using the access control parameters corresponding to the determined AC of the regular device and a scale factor.

In another embodiment of the present application, using the access control parameters corresponding to the identified AC of the UE further includes: determining an AC of a regular device corresponding to the identified AC, according to a reference AC indicated to the UE, the reference AC represents the AC of the regular device; and using the access control parameters corresponding to the determined AC of the regular device and a scale factor.

In an embodiment of the present application, the method further includes: identifying an AI and an AC of the UE; and identifying the device type of the UE as reduced capabilities according to the identified AI.

In an embodiment of the present application, the cell access related information includes access control parameters, and performing the access control comprising checking whether an access is barred by: determining an AC of a regular device corresponding to the identified AC, according to a mapping table which defines a mapping between ACs of the regular device and ACs of the UE with the device type of reduced capabilities; and using the access control parameters corresponding to the determined AC of the regular device and a scale factor.

In another embodiment of the present application, the cell access related information includes access control parameters, and performing access control comprising checking whether an access is barred by: determining an inferred AC corresponding to the identified AC, according to a mapping table which defines a mapping between the AIs and ACs of a regular device and the UE with the device type of reduced capabilities; and using the access control parameters corresponding to the determined AC.

In an embodiment of the present application, checking whether the access is barred after a selection of UAC-BarringPerPLMN entry irrespective of a uac-BarringForCommon message, or after the selection of a uac-BarringForCommon message, wherein the UAC-BarringPerPLMN entry and the uac-BarringForCommon message are received through a broadcast message. In another embodiment, checking whether the access is barred irrespective of a UAC-BarringPerPLMN message and a uac-BarringForCommon message, wherein the UAC-BarringPerPLMN message and the uac-BarringForCommon message are received through a broadcast message.

In an embodiment of the present application, the cell access related information is received through a broadcast message. The scale factor is received through a broadcast message. The indication information is received through a broadcast message with one bit. The mapping table is received through a broadcast message or is preconfigured. The reference AC is received through a broadcast message or is preconfigured. The access control parameters are received through a broadcast message.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can allow devices with reduced capabilities to be explicitly identifiable to networks and network operators, and also allow operators to restrict the access of the devices with reduced capabilities.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
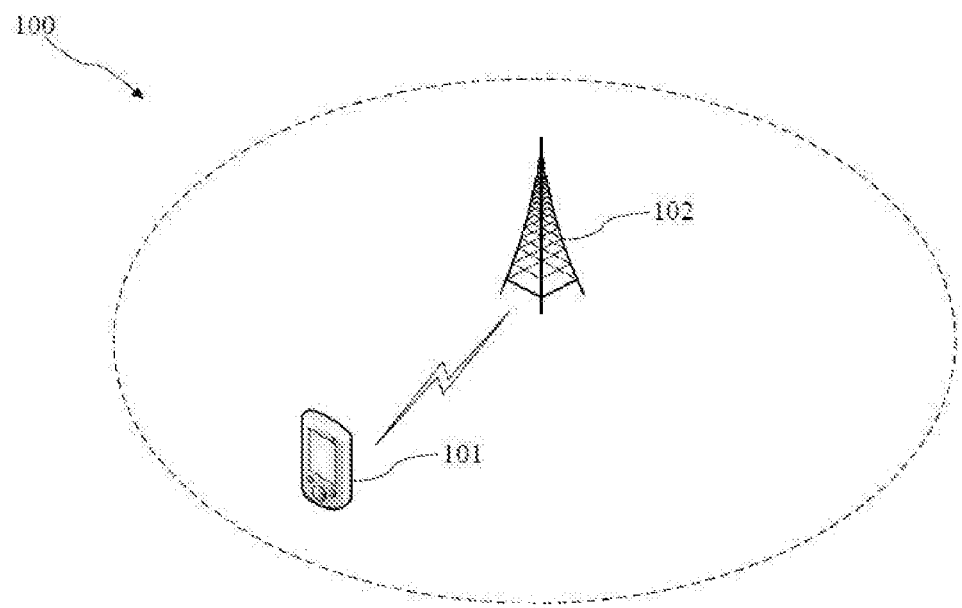
FIG. 1 illustrates a wireless communication system according to some embodiments of the present application.

FIG. 1 illustrates a wireless communication system 100 according to some embodiments of the present application.

Referring to FIG. 1, the wireless communication system 100 may include a UE 101 and a BS 102. Although a specific number of UE 101 and BS 102 are depicted in FIG. 1, it is contemplated that additional UEs 101 and BSs 102 may be available in the wireless communication system 100.

A BS 102 may be distributed over a geographic region, and may communicate with a core network (CN) node. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

A UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, a UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, industrial Internet-of-Things (IIoT) devices, or the like.

According to some embodiments of the present application, a UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, a UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a single-carrier frequency division multiple access (SC-FDMA) or OFDM scheme. More generally, however, the wireless communication system 100 may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with UE 101 using the 3GPP 5G protocols.

In the 5G NR, unified access control (UAC) is introduced. In particular, UAC supports all services, and maps different applications, services, voice calls, users with different priorities, etc. to the category, and the network side controls the access of the UE based on the category. The purpose of the UAC is to judge whether the UE can issue an access request, and the access request is associated with an access category (AC) and one or more access identity (AI).

In 3GPP TS 38.331, the UAC is specified as follows:
5.3.14.2 Initiation

```
Upon initiation of the procedure, the UE shall:
    1>  if timer T390 is running for the Access Category:
        2>  consider the access attempt as barred;
    1>  else if timer T302 is running and the Access Category is neither '2' nor '0':
        2>  consider the access attempt as barred;
    1>  else:
        2>  if the Access Category is '0':
            3>  consider the access attempt as allowed;
        2>  else:
            3>  if SIB1 includes uac-BarringPerPLMN-List and the uac-
                BarringPerPLMN-List contains an UAC-BarringPerPLMN entry with the
                plmn-IdentityIndex corresponding to the PLMN selected by upper layers
                (see TS 24.501 [23]):
                4>  select the UAC-BarringPerPLMN entry with the plmn-IdentityIndex
                    corresponding to the PLMN selected by upper layers;
                4>  in the remainder of this procedure, use the selected UAC-
                    BarringPerPLMN entry (i.e. presence or absence of access barring
                    parameters in this entry) irrespective of the uac-BarringForCommon
                    included in SIB1;
            3>  else if SIB1 includes uac-BarringForCommon:
                4>  in the remainder of this procedure use the uac-BarringForCommon
                    (i.e. presence or absence of these parameters) included in SIB1;
            3>  else:
                4>  consider the access attempt as allowed;
            3>  if uac-BarringForCommon is applicable or the uac-ACBarringListType
                indicates that uac-ExplicitACBarringList is used:
                4>  if the corresponding UAC-BarringPerCatList contains a UAC-
                    BarringPerCat entry corresponding to the Access Category:
                    5>  select the UAC-BarringPerCat entry;
                    5>  if the uac-BarringInfoSetList contains a UAC-BarringInfoSet entry
                        corresponding to the selected uac-barringInfoSetIndex in the UAC-
                        BarringPerCat:
                        6>  select the UAC-BarringInfoSet entry;
                        6>  perform access barring check for the Access Category as
                            specified in 5.3.14.5, using the selected UAC-BarringInfoSet as
                            "UAC barring parameter";
                    5>  else:
                        6>  consider the access attempt as allowed;
                4>  else:
                    5>  consider the access attempt as allowed;
            3>  else if the uac-ACBarringListType indicates that uac-
                ImplicitACBarringList is used:
                4>  select the uac-BarringInfoSetIndex corresponding to the Access
                    Category in the uac-ImplicitACBarringList,
                4>  if the uac-BarringInfoSetList contains the UAC-BarringInfoSet entry
                    corresponding to the selected uac-BarringInfoSetIndex:
                    5>  select the UAC-BarringInfoSet entry;
                    5>  perform access barring check for the Access Category as specified
                        in 5.3.14.5, using the selected UAC-BarringInfoSet as "UAC barring
                        parameter";
                4>  else:
                    5>  consider the access attempt as allowed;
            3>  else:
                4>  consider the access attempt as allowed;
```

-continued

```
1>  if the access barring check was requested by upper layers:
    2>  if the access attempt is considered as barred:
        3>  if timer T302 is running:
            4>  if timer T390 is running for Access Category '2':
                5>  inform the upper layer that access barring is applicable for all access
                    categories except categories '0', upon which the procedure ends;
            4>  else
                5>  inform the upper layer that access barring is applicable for all access
                    categories except categories '0' and '2', upon which the procedure
                    ends;
        3>  else:
            4>  inform upper layers that the access attempt for the Access Category is
                barred, upon which the procedure ends;
    2>  else:
        3>  inform upper layers that the access attempt for the Access Category is
            allowed, upon which the procedure ends;
1>  else:
    2>  the procedure ends.
```

5.3.14.5 Access Barring Check

```
The UE shall:
1>  if one or more Access Identities are indicated according to TS 24.501 [23], and
1>  if for at least one of these Access Identities the corresponding bit in the uac-
    BarringForAccessIdentity contained in "UAC barring parameter" is set to zero:
        2>          consider the access attempt as allowed;
1>  else:
        2>          draw a random number 'rand' uniformly distributed in the range: 0 ≤ rand <
                    1;
        2>          if 'rand' is lower than the value indicated by uac-BarringFactor included in
                    "UAC barring parameter":
                    3>          consider the access attempt as allowed;
        2>          else:
                    3>          consider the access attempt as barred;
1>  if the access attempt is considered as barred:
        2>          draw a random number 'rand' that is uniformly distributed in the range 0 ≤
                    rand < 1;
        2>          start timer T390 for the Access Category with the timer value calculated as
                    follows, using the uac-BarringTime included in "AC barring parameter":
                                T390 = (0.7+ 0.6 * rand) * uac-BarringTime
```

The AI and AC are defined in 3GPP TS 24.501. The following Table 4.5.2.1 lists the AIs.

TABLE 4.5.2.1

| Access Identity number | UE configuration |
|---|---|
| 0 | UE is not configured with any parameters from this table |
| 1 (NOTE 1) | UE is configured for multimedia priority service (MPS). |
| 2 (NOTE 2) | UE is configured for mission critical service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:

Access identity 1 is valid when:

the USIM file EFUAC_AIC indicates the UE is configured for access identity 1 and the RPLMN is the HPLMN (if the EHPLMN list is not present or is empty) or EHPLMN (if the EHPLMN list is present), or a visited PLMN of the home country (see the definition of home country in 3GPP TS 24.301 [15]); or the UE receives the 5GS network feature support IE with the MPS indicator bit set to "Access identity 1 valid in RPLMN or equivalent PLMN" from the RPLMN as described in subclause 5.5.1.2.4 and subclause 5.5.1.3.4.

NOTE 2:

Access identity 2 is used by UEs configured for MCS and is valid when:

the USIM file EFUAC_AIC indicates the UE is configured for access identity 2 and the RPLMN is the HPLMN (if the EHPLMN list is not present or is empty) or EHPLMN (if the EHPLMN list is present), or a visited PLMN of the home country (see 3GPP TS 23.122 [5]); or the UE receives the 5GS network feature support IE with the MCS indicator bit set to "Access identity 2 valid in RPLMN or equivalent PLMN" from the RPLMN as described in subclause 5.5.1.2.4 and subclause 5.5.1.3.4.

NOTE 3:

Access identities 11 and 15 are valid in HPLMN (if the EHPLMN list is not present or is empty) or EHPLMN (if the EHPLMN list is present). Access Identities 12, 13 and 14 are valid in HPLMN and visited PLMNs of home country only (see the definition of home country in 3GPP TS 24.301 [15]).

The following Table 4.5.2.2 is a mapping table for ACs.

TABLE 4.5.2.2

| Rule # | Type of access attempt | Requirements to be met | Access Category |
|---|---|---|---|
| 1 | Response to paging or NOTIFICATION over non-3GPP access; 5GMM connection management procedure initiated for the purpose of transporting an LPP message | Access attempt is for MT access | 0 (=MT_acc) |
| 2 | Emergency | UE is attempting access for an emergency session (NOTE 1, NOTE 2) | 2 (=emergency) |
| 3 | Access attempt for operator-defined access category | UE stores operator-defined access category definitions valid in the current PLMN as specified in subclause 4.5.3, and access attempt is matching criteria of an operator-defined access category definition | 32-63 (=based on operator classification) |
| 4 | Access attempt for delay tolerant service | (a) UE is configured for NAS signalling low priority or UE supporting S1 mode is configured for EAB (see the "ExtendedAccessBarring" leaf of NAS configuration MO in 3GPP TS 24.368 [17] or 3GPP TS 31.102 [22]) where "EAB override" does not apply, and (b). the UE received one of the categories a, b or c as part of the parameters for unified access control in the broadcast system information, and the UE is a member of the broadcasted category in the selected PLMN or RPLMN/equivalent PLMN (NOTE 3, NOTE 5, NOTE 6, NOTE 7, NOTE 8) | 1 (=delay tolerant) |
| 5 | MO MMTel voice call | Access attempt is for MO MMTel voice call or for NAS signalling connection recovery during ongoing MO MMTel voice call (NOTE 2) | 4 (=MO MMTel voice) |
| 6 | MO MMTel video call | Access attempt is for MO MMTel video call or for NAS signalling connection recovery during ongoing MO MMTel video call (NOTE 2) | 5 (=MO MMTel video) |
| 7 | MO SMS over NAS or MO SMSoIP | Access attempt is for MO SMS over NAS (NOTE 4) or MO SMS over SMSoIP transfer or for NAS signalling connection recovery during ongoing MO SMS or SMSoIP transfer (NOTE 2) | 6 (=MO SMS and SMSoIP) |
| 8 | UE NAS initiated 5GMM specific procedures | Access attempt is for MO signalling | 3 (=MO_sig) |
| 9 | UE NAS initiated 5GMM connection management procedure or 5GMM NAS transport procedure | Access attempt is for MO data | 7 (=MO_data) |

TABLE 4.5.2.2-continued

| Rule # | Type of access attempt | Requirements to be met | Access Category |
|---|---|---|---|
| 10 | An uplink user data packet is to be sent for a PDU session with suspended user-plane resources | No further requirement is to be met | 7 (=MO_data) |

NOTE 1:
This includes 5GMM specific procedures while the service is ongoing and 5GMM connection management procedures required to establish a PDU session with request type = "initial emergency request" or "existing emergency PDU session", or to re-establish user-plane resources for such a PDU session. This further includes the service request procedure initiated with a SERVICE REQUEST message with the Service type IE set to "emergency services fallback".<
NOTE 2:
Access for the purpose of NAS signalling connection recovery during an ongoing service, or for the purpose of NAS signalling connection establishment following fallback indication from lower layers during an ongoing service, is mapped to the access category of the ongoing service in order to derive an RRC establishment cause, but barring checks will be skipped for this access attempt.
NOTE 3:
If the UE selects a new PLMN, then the selected PLMN is used to check the membership; otherwise the UE uses the RLPMN or a PLMN equivalent to the RPLMN.
NOTE 4:
This includes the 5GMM connection management procedures triggered by the UE-initiated NAS transport procedure for transporting the MO SMS.
NOTE 5:
The UE configured for NAS signalling low priority is not supported in this release of specification. If a UE supporting both S1 mode and N1 mode is configured for NAS signalling low priority in S1 mode as specified in 3GPP TS 24.368 [17] or 3GPP TS 31.102 [22], the UE shall ignore the configuration for NAS signalling low priority when in N1 mode.
NOTE 6:
If the access category applicable for the access attempt is 1, then the UE shall additionally determine a second access category from the range 3 to 7. If more than one access category matches, the access category of the lowest rule number shall be chosen. The UE shall use the second access category only to derive an RRC establishment cause for the access attempt.
NOTE 7:
"EAB override" does not apply, if the UE is not configured to allow overriding EAB (see the "Override_ExtendedAccessBarring" leaf of NAS configuration MO in 3GPP TS 24.368 [17] or 3GPP TS 31.102 [22]), or if NAS has not received an indication from the upper layers to override EAB and the UE does not have a PDU session that was established with EAB override.
NOTE 8:
For the definition of categories a, b and c associated with access category 1, see 3GPP TS 22.261 [3]. The categories associated with access category I are distinct from the categories a, b and e associated with EAB (see 3GPP TS 22.011 [1A]).

The 3GPP TS 24.501 also describes a mapping between ACs/AIs and RRC establishment cause in section 4.5.6 as follows:

When 5GMM requests the establishment of a NAS-signaling connection, the RRC establishment cause used by the UE shall be selected according to one or more access identities (see subclause 4.5.2) and the determined access category by checking the rules specified in Table 4.5.6.1 and Table 4.5.6.2. If the access attempt matches more than one rule, the RRC establishment cause of the lowest rule number shall be used. If the determined access category is an operator-defined access category, then the RRC establishment cause used by the UE shall be selected according to Table 4.5.6.1 and Table 4.5.6.2 based on one or more access identities (see subclause 4.5.2) and the standardized access category determined for the operator-defined access category as described in subclause 4.5.3.

Table 4.5.6.1 is a mapping table for AIs/ACs and RRC establishment cause when establishing N1 non-access stratum (NAS) signaling connection via NR connected to 5GCN.

TABLE 4.5.6.1

| Rule # | Access identities | Access categories | RRC establishment cause is set to |
|---|---|---|---|
| 1 | 1 | Any category | mps-Priority Access |
| 2 | 2 | Any category | mcs-Priority Access |
| 3 | 11, 15 | Any category | high Priority Access |
| 4 | 12, 13, 14, | Any category | highPriority Access |
| 5 | 0 | 0 (=MT_acc) | mt-Access |
|  |  | 1 (=delay tolerant) | Not applicable (NOTE 1) |
|  |  | 2 (=emergency) | emergency |

TABLE 4.5.6.1-continued

| Rule # | Access identities | Access categories | RRC establishment cause is set to |
|---|---|---|---|
|  |  | 3 (=MO_sig) | mo-Signalling |
|  |  | 4 (=MO MMTel voice) | mo-VoiceCall |
|  |  | 5 (=MO MMTel video) | mo-VideoCall |
|  |  | 6 (=MO SMS and SMSoIP) | mo-SMS |
|  |  | 7 (=MO_data) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.
NOTE 2:
See subclause 4.5.2, table 4.5.2.1 for use of the access identities of 0, 1, 2, and 11-15.

Table 4.5.6.2 is a mapping table for AIs/ACs and RRC establishment cause when establishing N1 NAS signaling connection via evolved universal terrestrial radio access (E-UTRA) connected to 5GCN.

TABLE 4.5.6.2

| Rule # | Access identities | Access categories | RRC establishment cause is set to |
|---|---|---|---|
| 1 | 1 | Any category | highPriority Access |
| 2 | 2 | Any category | highPriority Access |
| 3 | 11, 15 | Any category | highPriority Access |
| 4 | 12, 13, 14, | Any category | highPriority Access |
| 5 | 0 | 0 (=MT_acc) | mt-Access |
|  |  | 1 (=delay tolerant) | Not applicable (NOTE 1) |
|  |  | 2 (=emergency) | emergency |
|  |  | 3 (=MO_sig) | mo-Signalling |

TABLE 4.5.6.2-continued

| Rule # | Access identities | Access categories | RRC establishment cause is set to |
|---|---|---|---|
| | | 4 (=MO MMTel voice) | mo-VoiceCall |
| | | 5 (=MO MMTel video) | mo-VoiceCall |
| | | 6 (=MO SMS and SMSoIP) | mo-Data |
| | | 7 (=MO_data) | mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.
NOTE 2:
See subclause 4.5.2, table 4.5.2.1 for use of the access identities of 0, 1, 2, and 11-15.

Figure 2:
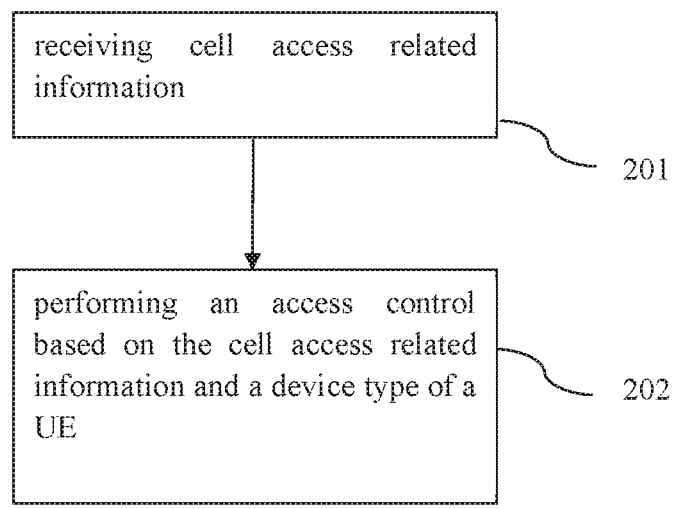
FIG. 2 is a flow diagram illustrating a method for restricting access of devices with reduced capabilities according to some embodiments of the present application.

FIG. 2 is a flow diagram illustrating a method for restricting access of devices with reduced capabilities in accordance with some embodiments of the present application. The method illustrated in FIG. 2 may be implemented by the UE 101 in FIG. 1. In the present application, although the different terms, the devices with reduced capabilities, the devices with the device type of reduced capabilities, the reduced capability devices, or the UEs with the device type of reduced capabilities are used, it should be understood that they all indicate the NR light devices.

The method for restricting access of devices with reduced capabilities according to the present application may be realized by adding new indication information, a new AI, and/or multiple new ACs.

As shown in FIG. 2, in step 201, the UE may receive cell access related information. In particular, the cell access related information may be received through a broadcast message. For example, the broadcast message may be a master information block (MIB) message, a system information block 1 (SIB1) message, or other kind of broadcast message.

In step 202, the UE may perform an access control based on the cell access related information and a device type of the UE.

The following will describe the detailed embodiments of the present application.

In some embodiments, all of the devices with reduced capabilities will be restricted to access a cell. In an embodiment, the UE receives indication information from a network side (for example, the BS 102 in FIG. 1), and the indication information indicates that all of the devices with reduced capabilities are allowed to access a cell or barred to access the cell. And then the UE may perform access control based on the indication information and the device type of the UE. For example, if the UE is a device with reduced capabilities (that is, a NR light device) and the indication information indicates that all of the devices with reduced capabilities are barred to access the cell, the UE will consider the access attempt as barred. If the indication information indicates that all of the devices with reduced capabilities are allowed to access the cell, the NR light device will consider the access attempt as allowed.

The indication information may be a broadcast message with one bit from the network side, or a new field included in the broadcast message, or other message. In an example, the indication information may be represented as 'cellBarredforlight', which indicates devices of reduced capabilities are allowed to access a cell or barred to access the cell (that is, information element (IE) type is "not barred" or "barred"). In an example, the indication information 'cellBarredforlight' is indicated in MIB message. The indication information 'cellBarredforlight' can be also called cell status. And in case of multiple public land mobile networks (PLMNs) indicated in SIB1, this field is common for all PLMNs.

In an embodiment, when cell status 'cellBarredforlight' is indicated as "not barred" and "not reserved" for operator use and not "true" for other use, all devices with reduced capabilities shall treat this cell as candidate during the cell selection and cell reselection procedures; when cell status 'cellBarredforlight' is indicated as "true" for other use, the devices with reduced capabilities shall treat this cell as if cell status is "barred"; when cell status 'cellBarredforlight' is indicated as "not barred" and "reserved" for operator use for any PLMN and not "true" for other use, the devices with reduced capabilities assigned to Access Identity 11 or 15 operating in their home PLMN (HPLMN)/equivalent home PLMN (EHPLMN) shall treat this cell as candidate during the cell selection and reselection procedures if the field cellReservedForOperatorUse for that PLMN set to "reserved", and the devices with reduced capabilities assigned to an Access Identity 0, 1, 2 and 12 to 14 shall behave as if the cell status is "barred" in case the cell is "reserved for operator use" for the registered PLMN or the selected PLMN.

In some embodiments, parts of the devices with reduced capabilities will be restricted to access a cell, and multiple new ACs for indicating the devices with reduced capabilities are introduced. Each new AC corresponds to one AC of devices with reduced capabilities, and the AIs are the same as legacy AIs (or the existing AIs).

Before performing the access control, a higher layer or an access layer may provide AI and AC information to the UE, thus the UE may identify the AI and the AC of the UE based on the AI and AC information, and further identify its device type according to the identified AC. In an example, NAS layer of the UE may provide the AI and AC information of the UE, to RRC layer of the UE. Thus, the RRC layer of the UE may identify the AI and the AC of the UE. Furthermore, the RRC layer of the UE may identify the device type of the UE as reduced capabilities according to the identified AC (because the identified AC is one of the new ACs for indicating the device with reduced capabilities).

Further, the UE may receive access control parameters, for example, UAC barring parameters, from the network side. For example, the access control parameters are received through a broadcast message, for example MIB, SIB1, or another SIB message. The UAC barring parameters include one or more barring configuration parameters sets (for example, represented as 'UAC-BarringInfoSet'), and each barring configuration parameters set may represent a combination of a barring factor and a barring time. The UE may check whether an access is barred (an access barring check) by using the barring configuration parameters set corresponding to the identified AC of the UE.

Specifically, in an embodiment, the UE may also receive a mapping table or a note, which defines a mapping between ACs of the regular device (legacy ACs or existing ACs) and ACs of the UE with reduced capabilities (the new ACs), from the network side. The UE may receive the mapping table or the note through a broadcast message. In another embodiment, the mapping table or note may be preconfigured in the UE. According to the mapping table, the UE may determine one legacy AC of the legacy ACs corresponding to the identified new AC.

The following Table 1 illustrates an example of the mapping table.

TABLE 1

| Access Category (regular device) | Access Category (reduced capability device) |
|---|---|
| 0 (=MT_acc) | |
| 2 (=emergency) | |
| 32-63 (=based on operator classification) | |
| 1 (=delay tolerant) | |
| 4 (=MO MMTel voice) | n |
| 5 (=MO MMTel video) | |
| 6 (=MO SMS and SMSoIP) | |
| 3 (=MO_sig) | z |
| 7 (=MO_data) | |
| 7 (=MO_data) | |

In the above Table 1, AC 'n' and AC 'z' are the new ACs for indicating the reduced capability device. For example, according to Table 1, for the new AC 'n', the UE will select the UAC-BarringInfoSet entry corresponding to the AC '4'. It should be understood that Table 1 is just an example of the mapping table, and it can be varied according to actual needs.

In an embodiment, the UE may also receive a new scale factor, for example represented as 'UAC-scalefactor', as a UAC barring parameter. For example, the UE may receive the new scale factor through a broadcast message, for example MIB, SIB1, or another SIB message. The scale factor is a value from 0 to 1. Once the new scale factor is broadcasted (for example in SIB1), it will be applied when the access barring check is carried out.

The following illustrates an example of the new scale factor.

```
UAC-BarringInfoSetList ::=    SEQUENCE (SIZE(1..maxBarringInfoSet)) OF UAC-
                              Barring InfoSet
UAC-BarringInfoSet ::=        SEQUENCE {
   uac-Barring Factor            ENUMERATED {p00, p05, p10, p15, p20, p25,
                                 p30, p40, p50, p60, p70, p75, p80,
                                 p85, p90, p95},
   uac-BarringTime               ENUMERATED {s4, s8, s16, s32, s64, s128,
                                 s256, s512},
   uac-BarringForAccessIdentity  BIT STRING (SIZE(7))
uac-scalefactor                  ENUMERATED {00, 05, 10, 15, 20, 25, 30, 40, 50, 60,
                                 70, 75, 80, 85, 90, 95, any value},
}
```

In the above example, the values of the uac-scalefactor are just examples, and the values may be changed according to actual configuration.

When the UE performs the access barring check, it uses the barring parameters and the new scale factor. For example, for the AC 'n', the UE uses the selected UAC-BarringInfoSet corresponding to the AC '4' and the uac-scalefactor. For example, uac-BarringFactor for AC 'n'=uac-BarringFactor for AC '4'×uac-scalefactor; and/or uac-BarringTime for AC 'n'=uac-BarringTime for AC '4'/uac-scalefactor.

In another embodiment, the UE may receive a reference AC, rather than the above-mentioned mapping table, from the network side. The reference AC represents an AC of a regular device, and it may be received through a broadcast message. In another example, the reference AC may be preconfigured in the UE. In the embodiment, the UE may identify the device type of the UE as reduced capabilities according to the identified AC (the identified AC is one of the new ACs), and the AIs are the same as legacy AIs. Therefore, according to the reference AC, the UE may determine a legacy AC corresponding to the identified AC. In the embodiment, the UE may also receive the new scale factor. And then when the UE performs the access barring check, it uses the barring parameters and the new scale factor, as above discussed.

In some embodiments, parts of the devices with reduced capabilities will be restricted to access a cell, and a new AI for indicating the devices with reduced capabilities is introduced, and the ACs are the same as the legacy ACs. That is, when a new AI for device with reduced capabilities is indicated, it means that the barring check is for the reduced capability device, and each of the AC corresponds to the AC of the reduced capability device. Before performing the access control, a higher layer or an access layer may provide AI and AC information to the UE, thus the UE may identify the AI and the AC of the UE based on the AI and AC information, and further identify its device type according to the identified AI. In an example, NAS layer of the UE may provide the AI and AC information of the UE, to RRC layer of the UE. Thus, the RRC layer of the UE may identify the AI and the AC of the UE. Furthermore, the RRC layer of the UE may identify the device type of the UE as reduced capabilities according to the identified AI (because the identified AI is the new AI for indicating the device with reduced capabilities).

Further, in an embodiment, the UE may receive access control parameters, for example, UAC barring parameters, from the network side. For example, the access control parameters are received through a broadcast message, for example MIB, SIB1, or another SIB message. The UAC barring parameters include one or more barring configuration parameters sets (for example, represented as 'UAC-BarringInfoSet'), and each barring configuration parameters set may represent a combination of a barring factor and a barring time. The UE may check whether an access is barred (an access barring check) by using the barring configuration parameters set corresponding to the identified AC of the UE.

Specifically, in an embodiment, the UE may also receive a mapping table or a note, which defines a mapping between ACs of the regular device (legacy ACs or existing ACs) and ACs of the UE with reduced capabilities, from the network side. The UE may receive the mapping table or the note through a broadcast message. In another embodiment, the mapping table or note may be preconfigured in the UE. According to the mapping table, the UE may determine a legacy AC corresponding to the identified AC, to obtain the actual AC for the access barring check. In another embodiment, the UE may not receive the mapping table or the note, and the UE may directly use the identified AC, that is the identified AC is the same as the legacy AC.

Furthermore, in the embodiment, the UE may also receive the new scale factor, as above discussed. Once the new scale factor is broadcasted (for example in SIB1), it will be applied when the access barring check is carried out.

When the UE performs the access barring check, it selects the UAC-BarringinfoSet entry corresponding to the determined AC and use the corresponding barring parameters and the new scale factor. For example, uac-BarringFactor for AC from the reduced capability device=uac-BarringFactor for AC from the regular device×uac-scalefactor; and/or uac-BarringTime for AC from the reduced capability device=uac-BarringTime for AC from the regular device/uac-scalefactor.

In another embodiment, the UE may not receive the above-mentioned new scale factor, from the network side. Furthermore, in this embodiment, the UE may receive a mapping table (or note), which is different from the above-mentioned mapping table, from the network side. The mapping table in this embodiment defines a mapping between the AIs and ACs of a regular device and the reduced capability device. In the embodiment, the UE may identify the device type of the UE as reduced capabilities according to the identified AI (the identified AI is the new AI for indicating the reduced capability device), and the ACs are the same as the legacy ACs. Furthermore, according to the mapping table, the UE may determine an inferred AC corresponding to the identified AC.

The following Table 2 illustrates an example of the mapping table in this embodiment.

It should be understood that Table 2 is just an example of the mapping table, and it can be varied according to actual needs.

When the UE performs the access barring check, it selects the UAC-BarringInfoSet entry corresponding to the inferred AC and use the corresponding barring parameters, that is, the selected UAC-BarringInfoSet (configured in SIB1, for example).

In an embodiment, the access barring check for the device with reduced capabilities described in the above embodiments may be performed irrespective of a UAC-BarringPerPLMN message and a uac-BarringForCommon message. The UE may receive the UAC-BarringPerPLMN message and the uac-BarringForCommon message through a broadcast message.

For example, the performing of the access barring check for the device with reduced capabilities can be described as follows:

3> if SIB1 includes uac-BarringPerPLMN-List and the uac-BarringPerPLMN-List contains an UAC-BarringPerPLMN entry with the plmn-IdentityIndex corresponding to the PLMN selected by upper layers (see TS 24.501 [23]):
......
3> else if SIB1 includes uac-BarringForCommon:
......
3> else if SIB1 includes uac-Barring ForReducedcapabilitydevice:
......
3> else:

TABLE 2

| Rule # | Acces identities | Access categories | RRC establishment cause is set to |
|---|---|---|---|
| 1 | 1 | Any category | mps-Priority Access |
| 2 | 2 | Any category | mcs-Priority Access |
| 3 | 11, 15 | Any category | highPriority Access |
| 4 | 12, 13, 14, | Any category | highPriority Access |
| 5 | 0 | 0 (=MT_acc) | mt-Access |
|  |  | 1 (=delay tolerant) | Not applicable (NOTE 1) |
|  |  | 2 (=emergency) | emergency |
|  |  | 3 (=MO_sig) | mo-Signalling |
|  |  | 4 (=MO MMTel voice) | mo-VoiceCall |
|  |  | 5 (=MO MMTel video) | mo-VideoCall |
|  |  | 6 (=MO SMS and SMSoIP) | mo-SMS |
|  |  | 7 (=MO_data) | mo-Data |
|  | One new Access Identity (indicate reduced capability device) | 0 (=MT_acc) a (=reducedcapabilitydevice_MT_acc) | reducedcapabilitydevice_mt-Access |
|  |  | 1 (=delay tolerant) b (=reducedcapabilitydevice_delay tolerant) | Not applicable (NOTE 1) |
|  |  | 2 (=emergency) c (=reducedcapabilitydevice_emergency) | reducedcapabilitydevice_emergency |
|  |  | 3 (=MO_sig) d (=reducedcapabilitydevice_MO_sig) | reducedcapabilitydevice_mo-Signalling |
|  |  | 4 (=MO MMTel voice) e (=reducedcapabilitydevice_MO MMTel voice) | reducedcapabilitydevice_mo-VoiceCall |
|  |  | 5 (=MO MMTel video) f (=reducedcapabilitydevice_MO MMTel video) | reducedcapabilitydevice_mo-VideoCall |
|  |  | 6 (=MO SMS and SMSoIP) g (=reducedcapabilitydevice_MO SMS and SMSoIP) | reducedcapabilitydevice_mo-SMS |
|  |  | 7 (=MO data) h (=reducedcapabilitydevice_MO data) | reducedcapabilitydevice_mo-Data |

NOTE 1:
A UE using access category 1 for the access barring check will determine a second access category in the range 3 to 7 that is to be used for determination of the RRC establishment cause. See subclause 4.5.2, table 4.5.2.2, NOTE 6.
NOTE 2:
See subclause 4.5.2, table 4.5.2.1 for use of the access identities of 0, 1, 2, and 11-15.

In the above description, "else if SIB1 includes uac-BarringForReducedcapabilitydevice . . ." represents the performing of the access barring check for the device with reduced capabilities.

In another embodiment, the access barring check for the device with reduced capabilities described in the above embodiments may be performed after a selection of UAC-BarringPerPLMN entry irrespective of a uac-BarringForCommon message, or after the selection of a uac-BarringForCommon message. The UE may receive the UAC-BarringPerPLMN entry and the uac-BarringForCommon message through a broadcast message.

For example, the performing of the access barring check for the device with reduced capabilities can be described as follows:

```
UAC-BarringPerPLMN-List ::=                                          SEQUENCE (SIZE (1.. maxPLMN))
     OF UAC-BarringPerPLMN
UAC-BarringPerPLMN-reducedcapabilitydevice ::=
     SEQUENCE {
        plmn-IdentityIndex                                              INTEGER (1..maxPLMN),
        uac-ACBarringListType                                           CHOICE{
              uac-ImplicitACBarringList                                    SEQUENCE
     (SIZE(maxAccessCat-1)) OF UAC-BarringInfoSetIndex,
              uac-ExplicitACBarringList                                    UAC-BarringPerCatList
     }
     OPTIONAL                                          -- Need S
UAC-BarringPerPLMN ::=                                                SEQUENCE {
        plmn-Identity Index                                              INTEGER (1..maxPLMN),
        uac-ACBarringListType                                           CHOICE{
              uac-ImplicitACBarringList                                    SEQUENCE
     (SIZE(maxAccessCat-1)) OF UAC-BarringInfoSetIndex,
              uac-ExplicitACBarringList                                    UAC-BarringPerCatList
     }
     OPTIONAL                                          -- Need S
}
UAC-BarringPerCatList ::=                                             SEQUENCE (SIZE (1..maxAccessCat-1))
     OF UAC-BarringPerCat
UAC-BarringPerCat ::=                                                 SEQUENCE {
        accessCategory                                                   INTEGER (1..maxAccessCat-1),
        uac-barringInfoSetIndex                                          UAC-BarringInfoSetIndex
}
     3>            if SIB1 includes uac-BarringPerPLMN-List and the uac-
                   BarringPerPLMN-List contains an UAC-BarringPerPLMN entry with the
                   plmn-IdentityIndex corresponding to the PLMN selected by upper layers
                   (see TS 24.501 [23]):
          4>       select the UAC-BarringPerPLMN entry with the plmn-IdentityIndex
                   corresponding to the PLMN selected by upper layers;
          4>       if the type/UE is reduced capability device and the UAC-
                   BarringPerPLMN-reducedcapabilitydevice is configured:
              5>           in the remainder of this procedure, use the selected UAC-
                           BarringPerPLMN-reducedcapabilitydevice entry (i.e. presence or
                           absence of access barring parameters in this entry) irrespective
                           of the uac-Barring ForCommon included in SIB1;
          4>       else:
              5>           in the remainder of this procedure, use the selected UAC-
                           BarringPerPLMN entry (i.e. presence or absence of access barring
                           parameters in this entry) irrespective of the uac-
                           BarringForCommon included in SIB1;
     3>            else if SIB1 includes uac-BarringForCommon:
          4>       in the remainder of this procedure use the uac-BarringForCommon
                   (i.e. presence or absence of these parameters) included in SIB1;
     3>            else:
          4>       consider the access attempt as allowed;
     3>            if uac-BarringForCommon is applicable or the uac-ACBarringListType
                   indicates that uac-ExplicitACBarringList is used:
          4>       if the corresponding UAC-BarringPerCatList contains a UAC-
                   BarringPerCat entry corresponding to the Access Category:
              5>       select the UAC-BarringPerCat entry;
              5>       if the uac-BarringInfoSetList contains a UAC-BarringInfoSet entry
                       corresponding to the selected uac-barringInfoSetIndex in the UAC-
                       BarringPerCat:
                  6>       select the UAC-BarringInfoSet entry;
                  6>       perform access barring check for the Access Category as
                           specified in 5.3.14.5, using the selected UAC-BarringInfoSet as
                           "UAC barring parameter";
              5>       else:
                  6>       consider the access attempt as allowed;
          4>       else:
              5>       consider the access attempt as allowed;
     3>            else if the uac-ACBarringListType indicates that uac-
                   ImplicitACBarringList is used:
          4>       select the uac-BarringInfoSetIndex corresponding to the Access
                   Category in the uac-ImplicitACBarringList,
          4>       if the uac-BarringInfoSetList contains the UAC-BarringInfoSet entry
                   corresponding to the selected uac-BarringInfoSetIndex:
```

```
            5>      select the UAC-BarringInfoSet entry;
            5>      perform access barring check for the Access Category as specified
                    in 5.3.14.5, using the selected UAC-BarringInfoSet as "UAC barring
                    parameter";
        4>  else:
            5>      consider the access attempt as allowed;
    3>  else:
        4>  consider the access attempt as allowed;
    ......
```

Therefore, through the above described embodiments, the devices with reduced capabilities are explicitly identifiable to networks and network operators, and the operators are also allowed to restrict the access of the devices with reduced capabilities.

Figure 3:
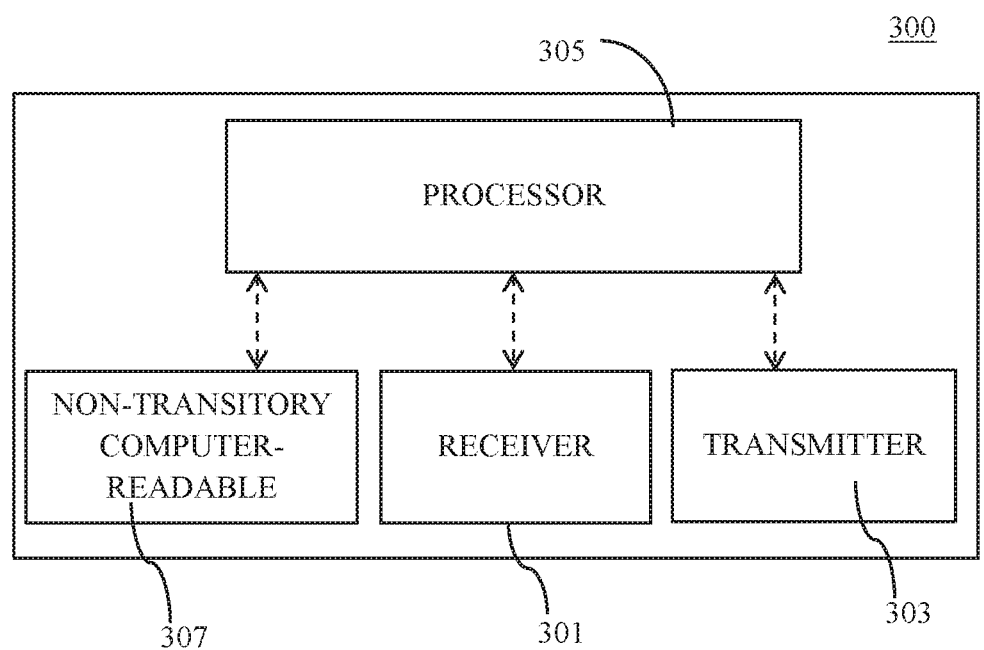
FIG. 3 illustrates an apparatus according to some embodiments of the present application.

FIG. 3 illustrates an apparatus according to some embodiments of the present application. In some embodiments of the present disclosure, the apparatus 500 may be a UE 101 as illustrated in FIG. 1 or other embodiments of the present application.

As shown in FIG. 3, the apparatus 300 may include a receiver 301, a transmitter 303, a processor 305, and a non-transitory computer-readable medium 307. The non-transitory computer-readable medium 307 has computer executable instructions stored therein. The processer 305 is configured to be coupled to the non-transitory computer readable medium 307, the receiver 301, and the transmitter 303. It is contemplated that the apparatus 300 may include more computer-readable mediums, receiver, transmitter and processors in some other embodiments of the present application according to practical requirements. In some embodiments of the present application, the receiver 301 and the transmitter 303 are integrated into a single device, such as a transceiver. In certain embodiments, the apparatus 300 may further include an input device, a memory, and/or other components.

In some embodiments of the present application, the non-transitory computer-readable medium 307 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
  receiving, from a network, cell access related information including first access control parameters;
  identifying an access identity (AI) and an access category (AC) of the UE;
  identifying the UE as a reduced capabilities device, according to one of the identified AC or the identified AI;
  determining second access control parameters corresponding to an AC of a non-reduced capabilities device according to the first access control parameters and a mapping table, wherein the mapping table defines a mapping between ACs of the non-reduced capabilities device and ACs of the reduced capabilities device; and
  performing an access control based on the cell access related information and a device type of the UE using the second access control parameters corresponding to the AC of the non-reduced capabilities device.

2. The method of claim 1, wherein the cell access related information includes indication information which indicates whether devices with a device type of reduced capabilities are allowed to access a cell or are barred from accessing the cell, and wherein the performing the access control is further based on the indication information.

3. The method of claim 1, wherein the cell access related information is received as part of a broadcast message.

4. The method of claim 1, wherein the performing the access control further comprises checking whether an access is barred by using the first access control parameters.

5. The method of claim 1, wherein the mapping table is received through a broadcast message or is preconfigured.

6. The method of claim 2, wherein the indication information comprises a single bit.

7. The method of claim 3, wherein the broadcast message comprises a system information block (SIB) or a master information block (MIB).

8. The method of claim 1, wherein the performing the access control further comprises checking whether an access is barred based on applying a scale factor to the first access control parameters.

9. The method of claim 1, wherein the performing the access control further comprises checking whether an access is barred based on applying a scale factor to the second access control parameters.

10. The method of claim 9, further comprising receiving the scale factor as part of a broadcast message.

11. A user equipment (UE) for wireless communication, comprising:
at least one memory; and
at least one processor coupled to the at least one memory and configured to cause the UE to:
receive, from a network, cell access related information including first access control parameters;
identify an access identity (AI) and an access category (AC) of the UE;
identify the UE as a reduced capabilities device, according to one of the identified AC or the identified AI;
determine second access control parameters corresponding to an AC of a non-reduced capabilities device according to the first access control parameters and a mapping table, wherein the mapping table defines a mapping between ACs of the non-reduced capabilities device and ACs of the reduced capabilities device; and
perform an access control based on the cell access related information and a device type of the UE using the second access control parameters corresponding to the AC of the non-reduced capabilities device.

12. The UE of claim 11, wherein the cell access related information includes indication information which indicates whether devices with a device type of reduced capabilities are allowed to access a cell or are barred from accessing the cell, and wherein the access control is further based on the indication information.

13. The UE of claim 11, wherein the cell access related information is received as part of a broadcast message.

14. The UE of claim 11, wherein wherein, to perform the access control, the at least one processor is further configured to cause the UE to check whether an access is barred by using the first access control parameters.

15. The UE of claim 12, wherein the indication information comprises a single bit.

16. The UE of claim 13, wherein the broadcast message comprises a system information block (SIB) or a master information block (MIB).

17. The UE of claim 11, wherein, to perform the access control, the at least one processor is further configured to cause the UE to check whether an access is barred based on applying a scale factor to the first access control parameters.

18. The UE of claim 11, wherein, to perform the access control, the at least one processor is further configured to cause the UE to check whether an access is barred based on applying a scale factor to the second access control parameters.

19. The UE of claim 18, wherein the at least one processor is further configured to cause the UE to receive the scale factor as part of a broadcast message.

20. An apparatus, comprising:
at least one memory; and
at least one processor coupled to the at least one memory and configured to cause the apparatus to:
transmit cell access related information to a user equipment (UE) configured to perform an access control based on the cell access related information and a device type of the UE; and
transmit, to the UE for the access control, a mapping table that defines a mapping between access categories (ACs) of a non-reduced capabilities device and ACs of a reduced capabilities device.

* * * * *